United States Patent
Liao et al.

(10) Patent No.: US 9,748,991 B2
(45) Date of Patent: Aug. 29, 2017

(54) LOW NOISE AMPLIFIER MODULE AND METHOD OF IMPLEMENTATION

(71) Applicant: Telefonaktiebolaget LM Ericsson (publ), Stockholm (SE)

(72) Inventors: Jichang Liao, Beijing (CN); Xiaoliang Du, Beijing (CN)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/910,672

(22) PCT Filed: Aug. 8, 2013

(86) PCT No.: PCT/CN2013/081051
§ 371 (c)(1),
(2) Date: Feb. 5, 2016

(87) PCT Pub. No.: WO2012/018020
PCT Pub. Date: Feb. 12, 2015

(65) Prior Publication Data
US 2016/0191092 A1   Jun. 30, 2016

(51) Int. Cl.
*H04B 1/10* (2006.01)
*H04B 1/16* (2006.01)
(Continued)

(52) U.S. Cl.
CPC ......... *H04B 1/1607* (2013.01); *H01P 1/2053* (2013.01); *H04B 1/006* (2013.01); *H04B 1/1036* (2013.01); *H04B 1/18* (2013.01)

(58) Field of Classification Search
CPC ......... H04B 1/1607; H04B 1/006; H04B 1/18
(Continued)

(56) References Cited

U.S. PATENT DOCUMENTS

| 6,927,646 B2 | 8/2005 | Niemi |
| 2004/0008094 A1* | 1/2004 | Niemi ................ H03F 3/72 333/101 |

(Continued)

FOREIGN PATENT DOCUMENTS

| CN | 1728611 A | 2/2006 |
| CN | 101013905 A | 8/2007 |

(Continued)

OTHER PUBLICATIONS

International Preliminary Report on Patentability, Application No. PCT/CN2013/081051, dated Feb. 18, 2016, 6 pages.

(Continued)

*Primary Examiner* — Wesley Kim
*Assistant Examiner* — Raj Chakraborty
(74) *Attorney, Agent, or Firm* — NDWE LLP

(57) ABSTRACT

A high performance switch module to filter a radio frequency signal and to selectively connect to an output includes a filter unit and a plurality of switches. The filter unit has a filter configured to connect to the radio frequency signal and having a plurality of parallel output ports. The plurality of switches is connected between the plurality of parallel output ports and the output, the plurality of switches configured to connect to a control input to selectively connect an output port of the plurality of parallel output ports to the output and to selectively connect a remainder of the plurality of parallel output ports to a connection providing a substantially full reflection to the remainder of the plurality of parallel output ports of the filter unit.

13 Claims, 6 Drawing Sheets

(51) Int. Cl.
*H04B 1/00* (2006.01)
*H04B 1/18* (2006.01)
*H01P 1/205* (2006.01)

(58) Field of Classification Search
USPC .......................................................... 455/307
See application file for complete search history.

(56) References Cited

U.S. PATENT DOCUMENTS

2007/0262829 A1* 11/2007 Chominski ............. H01P 1/127
                                                                              333/103
2008/0107216 A1    5/2008 Niemi
2014/0256271 A1*  9/2014 Kok ........................ H04B 1/44
                                                                                455/78

FOREIGN PATENT DOCUMENTS

| CN | 101194431 A | 6/2008 |
| CN | 102386852 A | 3/2012 |
| CN | 102779693 A | 11/2012 |
| EP | 1381162 A2 | 1/2004 |
| EP | 1383236 A1 | 1/2004 |
| EP | 2421151 A2 | 2/2012 |

OTHER PUBLICATIONS

Extended European Search Report, EP Application No. 13891146.6, dated Feb. 20, 2017, 8 pages.
First Office Action for CN Application No. 201380078832.9, dated Apr. 12, 2017, 26 pages.
International Search Report and Written Opinion, Application No. PCT/CN2013/081051, dated May 16, 2014, 12 pages.

\* cited by examiner

LOW NOISE AMPLIFIER MODULE AND METHOD OF IMPLEMENTATION

CROSS-REFERENCE TO RELATED APPLICATIONS

This application is a National stage of International Application No. PCT/CN2013/081051, filed Aug. 8, 2013, which is hereby incorporated by reference.

FIELD

Embodiments of the invention relate to the field of wireless communication systems; and more specifically, to a high performance switch and to a low noise amplifier module, e.g., for use in a base station of a wireless communication system.

BACKGROUND

In a typical wireless communication system (e.g., mobile or cellular radio network), mobile user equipment units communicate via a radio access network to one or more core networks. The mobile user equipment units can be mobile stations such as mobile telephones (i.e., cellular telephones) and laptops, tablets, etc. with mobile termination, and thus can be, for example, portable, pocket, hand-held, computer-included, or car-mounted mobile devices which communicate voice and/or data with radio access network.

The radio access network covers a geographical area which is divided into cell areas, with each cell area being served by a base station of the wireless communication system. A cell is a geographical area where radio coverage is provided by the base station equipment at a base station site. Each cell is identified by a unique identity, which is broadcast in the cell. The radio base stations communicate over the air interface (e.g., radio frequency signal) with the user equipment units within range of the base stations. The antennas of the base stations receive the wireless "inputs" (e.g., radio frequency signal) and then filter out undesired noise and amplify the radio frequency signal. These amplifiers are sometimes referred to as low noise amplifiers (LNAs) and may be tower mounted amplifiers. Low noise may refer to the noise figure being less than an undesired level (e.g., as measured in decibels).

However, in order to enable reception of the radio frequency signal when there is problem with the amplifier, for instance because of a failure to supply power to the amplifier, there is often a bypass branch provided, which outputs a received radio frequency signal without amplification. This allows the base station to function even if the amplifier does not work. In this way, an operator can continue to provide (e.g., limited) service even though the amplifier does not function. The bypass branch thus can connect to the inputted radio frequency signal (e.g., from an antenna) in a so-called bypass mode.

Existing bypass solutions may require providing impedance (e.g., variable impedance) in the bypass branch to balance the impedance of the amplifier and/or providing two or more amplifiers to create a balanced amplifier module.

Existing bypass solutions may have a low noise amplifier and bypass path that impact each other, namely an (e.g., unused) port not having substantially full reflection and thus impacting other port(s). Further, in existing bypass solutions, in bypass mode, the amplifier input impedance is arbitrary, so the signal in the bypass path is arbitrary and at the same time, the amplifier is an active component so the bypass linearity is also limited by the amplifier path.

SUMMARY

In one embodiment, a high performance switch module (100) to filter a radio frequency [RF] signal (102) and to selectively connect to an output (111, 112, 113) includes a filter unit (110, 410) having a filter (440) configured to connect to the radio frequency signal (102, 202, 302) and having a plurality of parallel output ports (121, 122, 123), and a plurality of switches (131, 132,133). The plurality of switches is connected between the plurality of parallel output ports and the output. The plurality of switches are configured to connect to a control input to selectively connect an output port (121, 122, 123) of the plurality of parallel output ports to the output and to selectively connect a remainder of the plurality of parallel output ports to a connection (104, 106, 108) providing a substantially full reflection to the remainder of the plurality of parallel output ports of the filter unit.

In one embodiment, a method is implemented in a high performance switch module (100) to filter a radio frequency signal (102) and to selectively connect to an output (111, 112, 113). The method can include receiving (502) the radio frequency signal (102) with the high performance switch module (100), filtering (504) the radio frequency signal with a filter unit (210, 310, 410) of the high performance switch module having a filter (440) connected to the radio frequency signal and having a plurality of parallel output ports (121, 122, 123). A plurality of switches (131, 132, 133) are connected to the plurality of parallel output ports and the output. A control input is transmitted (506) to the plurality of switches that selectively connects an output port (121, 122, 123) of the plurality of parallel output ports to the output and selectively connects a remainder of the plurality of parallel output ports to a connection (104, 106, 108) providing a substantially full reflection to the remainder of the plurality of parallel output ports of the filter unit.

In one embodiment, e.g., for use in a base station of a wireless communication system, a low noise amplifier (LNA) module (200, 300) is disclosed having a bypass branch (203, 303) to selectively supply a radio frequency signal (202, 302) without amplification from a low noise amplifier (201, 301) to an output (211, 311). The LNA module can include a filter unit (210, 310, 410) having a filter (440) configured to connect to the radio frequency signal and having a first parallel output port (221,321) and a second parallel output port (222, 322). The LNA module can further include an output switch (233, 333) selectively connecting the output to the low noise amplifier and to the bypass branch, and a switch (231, 232, 331, 332) selectively connecting the first parallel output port to the low noise amplifier and to a connection (204, 305) providing a substantially full reflection to the first parallel output port. The switch selectively connects the second parallel output port to the bypass branch and to a connection (206, 307) providing a substantially full reflection to the second parallel output port. At least one of the output switch and the switch is configured to connect to a control input. A base station of a wireless communication system may include a low noise amplifier module according to any of the disclosure herein.

In one embodiment, a method is disclosed that is implemented in a low noise amplifier module (200, 300) having a bypass branch (203, 303) to selectively supply a radio frequency signal (202, 302) without amplification from a low noise amplifier (201, 301) to an output (211, 311). The method can include receiving (602) the radio frequency signal with the low noise amplifier module and filtering (604) the radio frequency signal with a filter unit (210, 310, 410) having a filter (440) connected to the radio frequency signal and having a first parallel output port (221, 321) and a second parallel output port (222, 322). The output is selectively connected (606) to one of the low noise amplifier and the bypass branch with an output switch (233, 333). The method selectively connects (608) with a switch (231, 232, 331, 332), the first parallel output port to the low noise amplifier and the second parallel output port to a connection (206, 307) providing a substantially full reflection to the second parallel output port when the output switch connects the output to the low noise amplifier. The method also selectively connects (610) with the switch, the first parallel output port to a connection (204, 305) providing a substantially full reflection to the first parallel output port and the second parallel output port to the bypass branch when the output switch connects the output to the bypass branch. A base station of a wireless communication system may include a low noise amplifier module configured to perform any method disclosed herein.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled", along with its derivatives, can be used to indicate that two or more elements, which may or may not be in direct physical or electrical contact with each other, co-operate or interact with each other. "Connected", along with its derivatives, can be used to indicate the establishment of communication between two or more elements that are coupled with each other. "Selectively connected", along with its derivatives, can be used to indicate two or more elements that are connected (e.g., electrically and/or physically) together in a first state and uncoupled in a second state, for example, in response to a control input. For example, ports A, B, and C may be selectively connected such that port A may connect to port B in a first state and port A may connect to port C in a second state. For example, ports A, B, and C may be selectively connected such that port A may electrically connect to port B in a first state and port A may electrically connect to port C in a second state. In one embodiment, port A may only be connected to one of port B and C at a (e.g., any) time.

Figure 1:
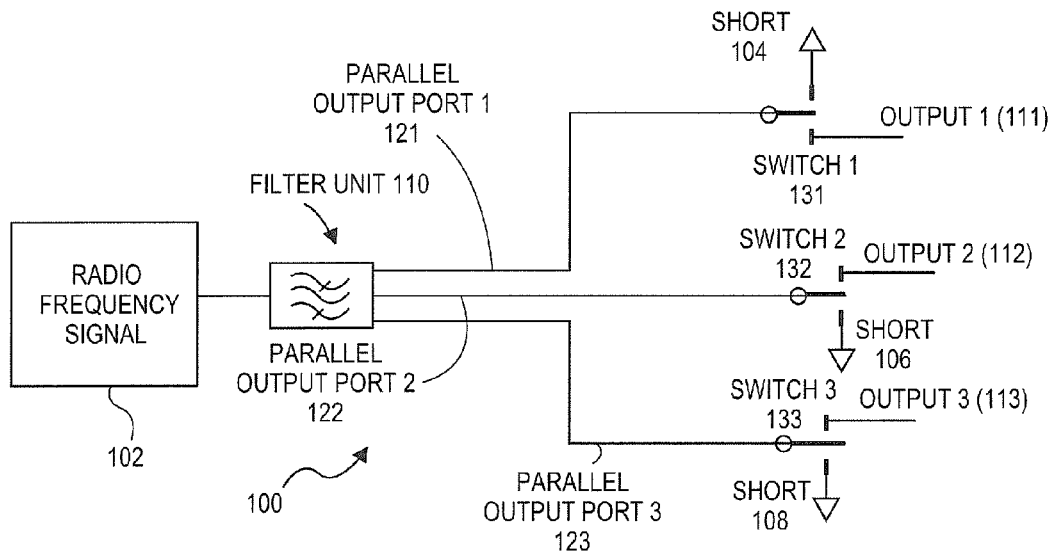
FIG. 1 illustrates a high performance switch according to one embodiment of the invention.

FIG. 1 illustrates a high performance (e.g., high performance being a low insertion loss [IL]) switch 100 according to one embodiment of the invention. Radio frequency signal 102 can be transmitted (e.g., outputted and/or outputted from an antenna) to an input of a filter unit 110. Filter unit 110 can include a filter, e.g., to filter out any unwanted radio frequency signals (e.g., waves) from the radio frequency signal 102. Filter can be selected to receive a radio frequency signal 102 and output a radio frequency signal with an acceptable noise figure (e.g., as measured in decibels). Filter can be a cavity filter, a surface acoustic wave (SAW) filter, a bulk acoustic wave (BAW) filter, or any combination thereof. Filter unit 110 is depicted as having three parallel output ports 121-123, although any plurality of parallel output ports can be used without departing from the spirit of the invention. For example, a filter unit can have two or more parallel output ports, three or more parallel output ports, four or more parallel output ports, etc.

Each parallel output port can connect to a respective switch. For example, in FIG. 1, parallel output port 1 (121) connects (e.g., the establishment of communication with) to the input of switch 1 (131), parallel output port 2 (122) connects to the input of switch 2 (132), and parallel output port 3 (123) connects to the input of switch 3 (133). Although not illustrated, each parallel output port can connect to a single switch, e.g., with a number of inputs corresponding to the number of parallel output ports with a desired input(s) selectively connectable to a single output. In FIG. 1, switch 1 (131) selectively connects (e.g., electrically) parallel output port 1 (121) to output 1 (111) and to a connection 104 providing a substantially full reflection to parallel output port 1 (121), e.g., selectively connecting parallel output port 1 (121) to one of output 1 (111) and connection 104 providing a substantially full reflection. In FIG. 1, switch 2 (132) selectively connects (e.g., electrically) parallel output port 2 (122) to output 2 (112) and to a connection 106 providing a substantially full reflection to parallel output port 2 (122), e.g., selectively connecting parallel output port 2 (122) to one of output 2 (112) and connection 106 providing a substantially full reflection. In FIG. 1, switch 3 (133) selectively connects (e.g., electrically) parallel output port 3 (123) to output 3 (113) and to a connection 108 providing a substantially full reflection to parallel output port 3 (123), e.g., selectively connecting parallel output port 3 (123) to one of output 3 (113) and connection 108 providing a substantially full reflection. Selective connection can be controlled by at least one control input. For example, a controller can be connected to a switch (or all switches) connected to send a transitory machine-readable transmission medium (e.g., signal) to the control input.

Although the connections (104, 106, 108) are illustrated as short connection, as is known in the electrical arts, one of ordinary skill in the art will appreciate that it can be a ground connection or other type of connection to provide a substantially full reflection to parallel output port(s). Although all connections (104, 106,108) are illustrated as being the same type (e.g., a short connection), any combination of types can be used.

As used herein, "substantially full reflection" can refer to reflecting any wave received back at a minimal level of loss (e.g., an acceptable level given a particular use). The substantially full reflective connection can be a short connection such that the impedance of that connection (e.g., load) is considered about zero ohms (e.g., full reflection and inverted polarity to the reflected wave). The substantially full reflective connection can be a ground connection such that the impedance of that connection (e.g., load) is considered about infinity ohms (e.g., full reflection and same polarity to the reflected wave). Switch as used herein refers to a device for making, breaking, or changing the connections in an electrical circuit. A switch can be a PIN diode (e.g., configured to function as a switch), a microelectromechanical systems (MEMS) switch, or other switch.

High performance switch can be used in a base station of a wireless communication system, downlink for different power level output select, and/or low power Time-division duplexing (TDD) system for uplink and downlink change. For example, a transmitter may have two outputs, one for high power output and one for low power output, wherein the high performance switch disclosed herein selects one of the high power and lower outputs to connect to its output. As an additional example, in a TDD system, when the transmitter (TX) output power is low (e.g., less than about 5 Watts), the high performance switch disclosed herein may be used to replace a transmitter (TX) switch. In such an embodiment, the transmitter and receiver (TX/RX) may utilize the same filter, e.g., cavity filter.

A high performance switch and/or method according to this disclosure can be used in (e.g., integrated into) mobile user equipment, for example, a high performance switch in mobile stations such as mobile telephones (i.e., cellular telephones) and/or laptops, tablets, etc. with mobile termination. Mobile user equipment may include, but is not limited to, portable, pocket, hand-held, computer-included, or car-mounted mobile devices which communicate voice and/or data with a radio access network.

Figure 2A:
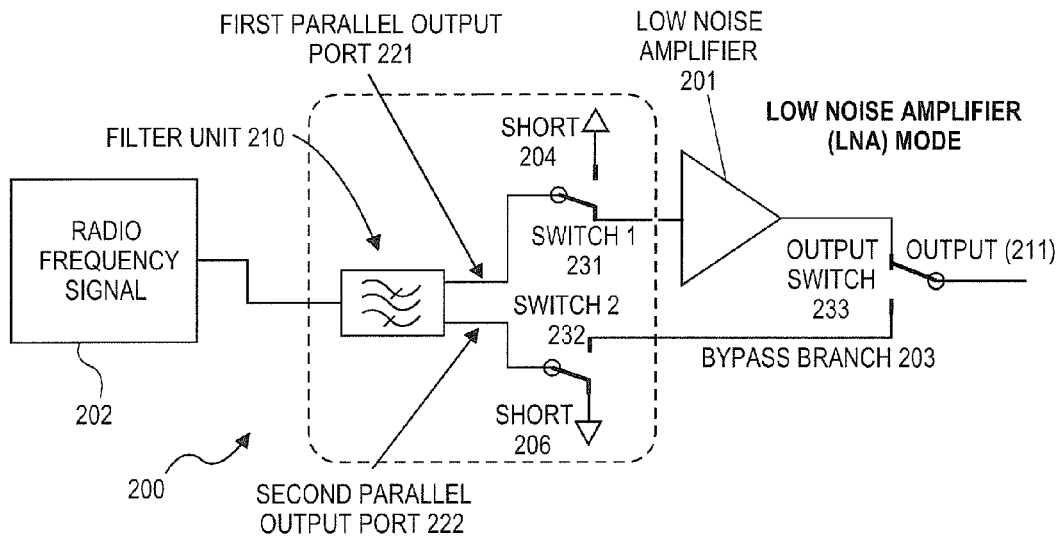
FIG. 2A illustrates a low noise amplifier (LNA) module in LNA mode according to one embodiment of the invention.
Figure 2B:
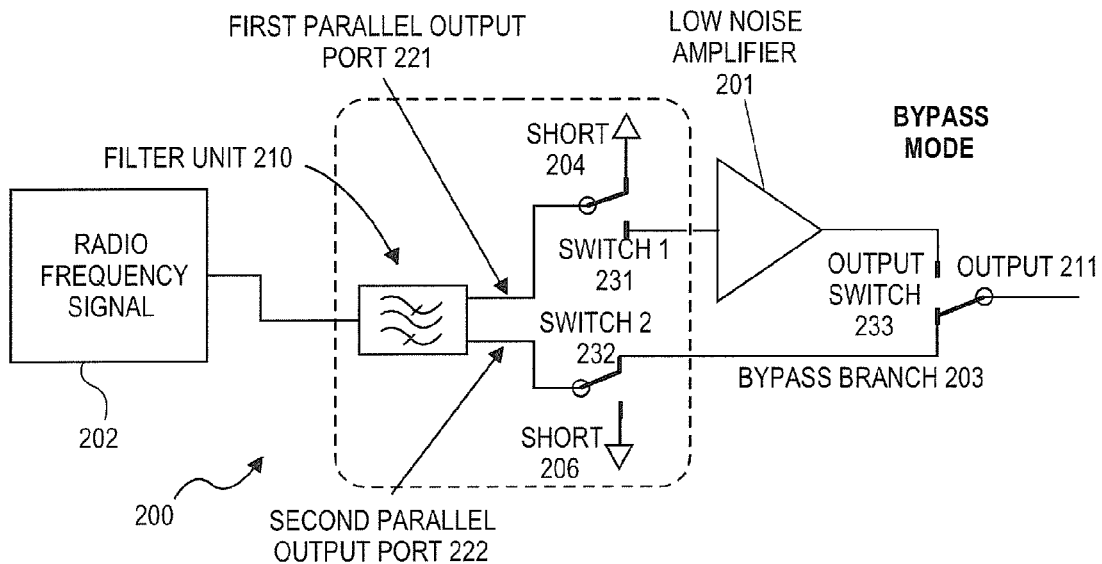
FIG. 2B illustrates a low noise amplifier (LNA) module in bypass mode according to one embodiment of the invention.

FIG. 2A illustrates a low noise amplifier (LNA) module 200 in LNA mode according to one embodiment of the invention. FIG. 2B illustrates a low noise amplifier (LNA) module in bypass mode according to one embodiment of the invention.

FIGS. 2A-2B depict a radio frequency signal 202 (e.g., received from an antenna) connected to an input of filter unit 210. Filter unit 210 as depicted includes a first parallel output port 221 and a second parallel output port 222. Parallel output ports (221,222) can output a wave (e.g., a radio frequency signal) from filter unit 210. Filter unit 210 can include a filter, e.g., to filter out any unwanted radio frequency signals (e.g., waves) from the radio frequency signal 202. Filter can be selected to receive a radio frequency signal 202 and output a radio frequency signal with an acceptable noise figure (e.g., as measured in decibels). Filter can be a cavity filter, a surface acoustic wave (SAW) filter, a bulk acoustic wave (BAW) filter, or any combination thereof. Filter unit 210 is depicted as having two parallel output ports (221, 222), although any plurality of parallel output ports can be used without departing from the spirit of the invention. For example, a filter unit can have three or more parallel output ports, four or more parallel output ports, etc. Each parallel output port can connect to a respective switch. Although not illustrated, each parallel output port can connect to a single switch, e.g., with a number of inputs corresponding to the number of parallel output ports with a desired input(s) selectively connectable to a branch (e.g., LNA 201 branch or bypass branch 203). In FIGS. 2A-2B, switch 1 (231) selectively connects (e.g., electrically) first parallel output port (221) to output (211) and to a connection 204 providing a substantially full reflection to first parallel output port (221), e.g., selectively connecting first parallel output port (221) to one of output (211) and connection 204 providing a substantially full reflection. In FIGS. 2A-2B, switch 2 (232) selectively connects (e.g., electrically) second parallel output port (222) to output (212) and to a connection 206 providing a substantially full reflection to second parallel output port (222), e.g., selectively connecting second parallel output port (222) to one of output (211) and connection 206 providing a substantially full reflection. Selective connection can be controlled by at least one control input. For example, a controller can be connected to a switch (or all switches) connected to send a transitory machine-readable transmission medium (e.g., signal) to the control input.

Although only two branches are illustrated, i.e., the LNA 201 branch and the bypass branch 203, a plurality of either or both types of branches can be included without departing from the spirit of the invention.

FIG. 2A depicts LNA mode where switch 1 (231) connects (e.g., electrically) the first parallel output port 221 to the input of the low noise amplifier (LNA) 201 and switch 2 (232) connects (e.g., electrically) second parallel output port 222 to a connection 206 providing a substantially full reflection to second parallel output port 222. Further, FIG. 2A depicts output switch 233 connecting the output 211 to the low noise amplifier 201 output, e.g., such that a filtered and amplified wave (e.g., radio frequency signal) is outputted to the output 211. Output switch 233 can be any type of switch. Selective connection of output switch or other switches can be controlled by at least one control input. For example, a controller can be connected to a switch and/or output switch (or all such switches) connected to send a transitory machine-readable transmission medium (e.g., signal) to the control input.

FIG. 2B depicts a Bypass mode where switch 2 (232) connects (e.g., electrically) the second parallel output port 222 to the bypass branch 203 (e.g., which can be a wire, where the wire can have a resistance of about zero ohms) and switch 1 (231) connects (e.g., electrically) first parallel output port 221 to a connection 204 providing a substantially full reflection to first parallel output port 221. Further, FIG. 2B depicts output switch 233 connecting the output 211 to the bypass branch 203, e.g., such that a filtered and unamplified wave (e.g., radio frequency signal) is outputted to the output 211. Output switch 233 can be any type of switch. Selective connection of output switch or other switches can be controlled by at least one control input. For example, a controller can be connected to a switch and/or output switch (or all such switches) connected to send a transitory machine-readable transmission medium (e.g., signal) to the control input. In one embodiment, a controller can send a transitory machine-readable transmission medium (e.g., signal) to the control input of the switches (231, 232) and/or output switch 211 to (i) selectively connect first parallel output port 221 to input of LNA 201 and/or output of LNA 201 to output 211, e.g., LNA mode in FIG. 2A, and/or to (ii) selectively connect second parallel output port 222 to input of bypass branch 203 and/or output of bypass branch 203 to output 211, e.g., Bypass mode in FIG. 2B. Additionally or alternatively, a controller can send a transitory machine-readable transmission medium (e.g., signal) to the control input of the switches (231, 232) and/or output switch 211 to selectively (i) connect second parallel output port 222 to connection 206 providing a substantially full reflection and/or disconnect the output of bypass branch 203 from output 211, e.g., LNA mode in FIG. 2A, and/or to (ii) connect first parallel output port 221 to connection 204 providing a substantially full reflection and/or disconnect output of LNA 201 from output 211, e.g., Bypass mode in FIG. 2B.

Although the connections (204, 206) are illustrated as short connection, as is known in the electrical arts, one of ordinary skill in the art will appreciate that it can be a ground connection or other type of connection to provide a substantially full reflection to parallel output port(s). Although all connections (204, 206) are illustrated as being the same type (e.g., a short connection), any combination of types can be used.

Figure 3:
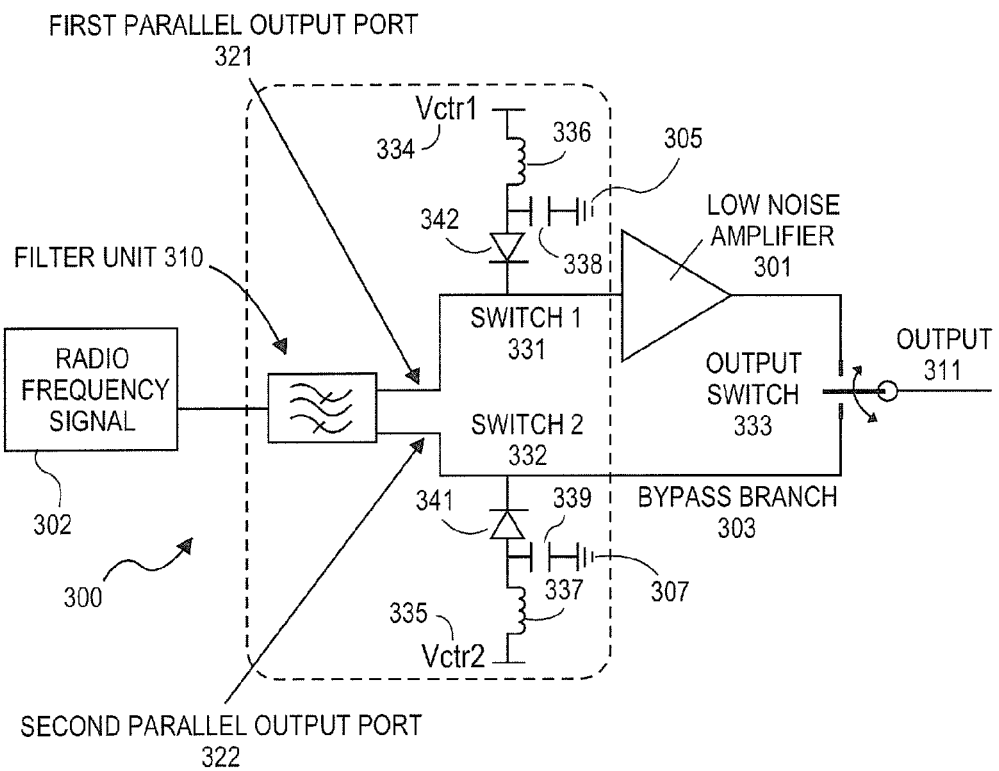
FIG. 3 illustrates a low noise amplifier (LNA) module according to one embodiment of the invention.

FIG. 3 illustrates a low noise amplifier (LNA) module 300 according to one embodiment of the invention. FIG. 3 depicts a radio frequency signal 302 (e.g., received from an antenna) connected to an input of filter unit 310. Filter unit 310 as depicted includes a first parallel output port 321 and a second parallel output port 322. Parallel output ports (321,322) may output a wave (e.g., a radio frequency signal) from filter unit 310. Filter unit 310 can include a filter, e.g., to filter out any unwanted radio frequency signals (e.g., waves) from the radio frequency signal 202. Filter can be selected to receive a radio frequency signal 302 and output a radio frequency signal with an acceptable noise figure (e.g., as measured in decibels). Filter can be a cavity filter, a surface acoustic wave (SAW) filter, a bulk acoustic wave (BAW) filter, or any combination thereof. Filter unit 310 is depicted as having two parallel output ports (321, 322), although any plurality of parallel output ports can be used without departing from the spirit of the invention. For example, a filter unit can have three or more parallel output ports, four or more parallel output ports, etc. Each parallel output port can connect to a respective switch. Although not illustrated, each parallel output port can connect to a single switch, e.g., with a number of inputs corresponding to the number of parallel output ports with a desired input(s) selectively connectable to a branch (e.g., LNA 301 branch or bypass branch 303). In FIG. 2, switch 1 (331) selectively connects (e.g., electrically) first parallel output port (321) to output (311) and to a connection 305 providing a substantially full reflection to first parallel output port (321), e.g., selectively connecting first parallel output port (321) to one of output (311) and connection 305 providing a substantially full reflection. In FIG. 3, switch 2 (332) selectively connects (e.g., electrically) second parallel output port (322) to output (312) and to a connection 307 providing a substantially full reflection to second parallel output port (322), e.g., selectively connecting second parallel output port (322) to one of output (311) and connection 307 providing a substantially full reflection. Selective connection can be controlled by at least one control input. For example, a controller can be connected to a switch (or all switches) connected to send a transitory machine-readable transmission medium (e.g., signal) to the control input. Although only two branches are illustrated, i.e., the LNA 301 branch and the bypass branch 307, a plurality of either or both types of branches can be included without departing from the spirit of the invention.

Depicted switch 1 (331) includes a diode 342, e.g., a PIN diode, connected (e.g., electrically) between the first parallel output port 321 and the input to the low noise amplifier (LNA) 301. Depicted switch 1 (331) also includes an inductor 336 connected to the diode 342 and to a capacitor 338 (e.g., decoupling capacitor) connected to the ground 305. Depicted switch 2 (332) includes a diode 341, e.g., a PIN diode, connected (e.g., electrically) between the second parallel output port 322 and the input to the bypass branch 303. Depicted switch 2 (332) also includes an inductor 337 connected to the diode and to a capacitor (e.g., decoupling capacitor) 339 connected to the ground 307. Inductor(s) may be used for a radio frequency choke (RFC) function, as is known in the art. For example, to block high frequency alternating current (AC) in the electrical circuit, while allowing lower frequency AC current and/or DC current to pass through.

In one embodiment, a transitory machine-readable transmission medium (e.g., signal) is a voltage (Vctr1 [334], e.g., Vcontrol 1)(Vctr2 [335], e.g., Vcontrol 2) supplied to a respective switch (331, 332) circuit. For example, if Vctr1 (334) is a (e.g., negative) voltage applied to diode 342, e.g., through inductor 336, less than the voltage at first parallel output port 321, the diode depicted is "off" and thus substantially no signal flows through the diode and thus first parallel output port 321 selectively connects (e.g., electrically) to the LNA 301. Additionally or alternatively, if Vctr1 (334) is a (e.g., positive) voltage applied to diode 342, e.g., through inductor 336, greater than the voltage at first parallel output port 321, the diode depicted is "on" and thus the signal (e.g., radio frequency signal or wave) flows through the diode and through the capacitor (optional) 338 into the ground 305 thus first parallel output port 321 selectively connects (e.g., electrically) to the ground 305 to provide the substantially full reflection.

For example, if Vctr2 (335) is a (e.g., negative) voltage applied to diode 341, e.g., through inductor 337, less than the voltage at second parallel output port 322, the diode depicted is "off" and thus substantially no current flows through the diode and thus second parallel output port 322 selectively connects (e.g., electrically) to the bypass branch 303. Additionally or alternatively, if Vctr2 (335) is a (e.g., positive) voltage applied to diode 341, e.g., through inductor 337, greater than the voltage at second parallel output port 322, the diode depicted is "on" and thus the current (e.g., radio frequency signal or wave) flows through the diode and through the capacitor (optional) 339 into the ground 307 thus second parallel output port 322 selectively connects (e.g., electrically) to the ground 307 to provide the substantially full reflection. A control input can thus include a voltage provided thereto, e.g., by a controller.

In one state, Vctr1 (334) is a positive voltage and Vcrt2 (335) is a negative voltage, simultaneously. In another state, Vctr1 (334) is a negative voltage and Vcrt2 (335) is a positive voltage, simultaneously.

In one state, Vctr1 (334) voltage is greater than the voltage at the first parallel output port (321) and Vcrt2 (335) voltage is less than the voltage as the second parallel output port (322), simultaneously. In another state, Vctr1 (334) voltage is less than the voltage at the first parallel output port (321) and Vcrt2 (335) voltage is greater than the voltage as the second parallel output port (322), simultaneously.

One skilled in the art of circuits will understand other circuits can be utilized to provide a substantially full reflection to a parallel output port(s) without departing from the spirit of the invention. This can include providing a short connection or providing a ground connection, e.g., as shown in FIG. 3.

Note the diodes in FIG. 3 are shown in the convention that the positive flow of electrons is the direction of positive flow of current, as opposed to the U.S. convention of positive flow of current being the opposite direction of electron flow. One skilled in the electrical arts will appreciate how to construct such a circuit under either convention without departing from the spirit of the invention.

Figure 4A:
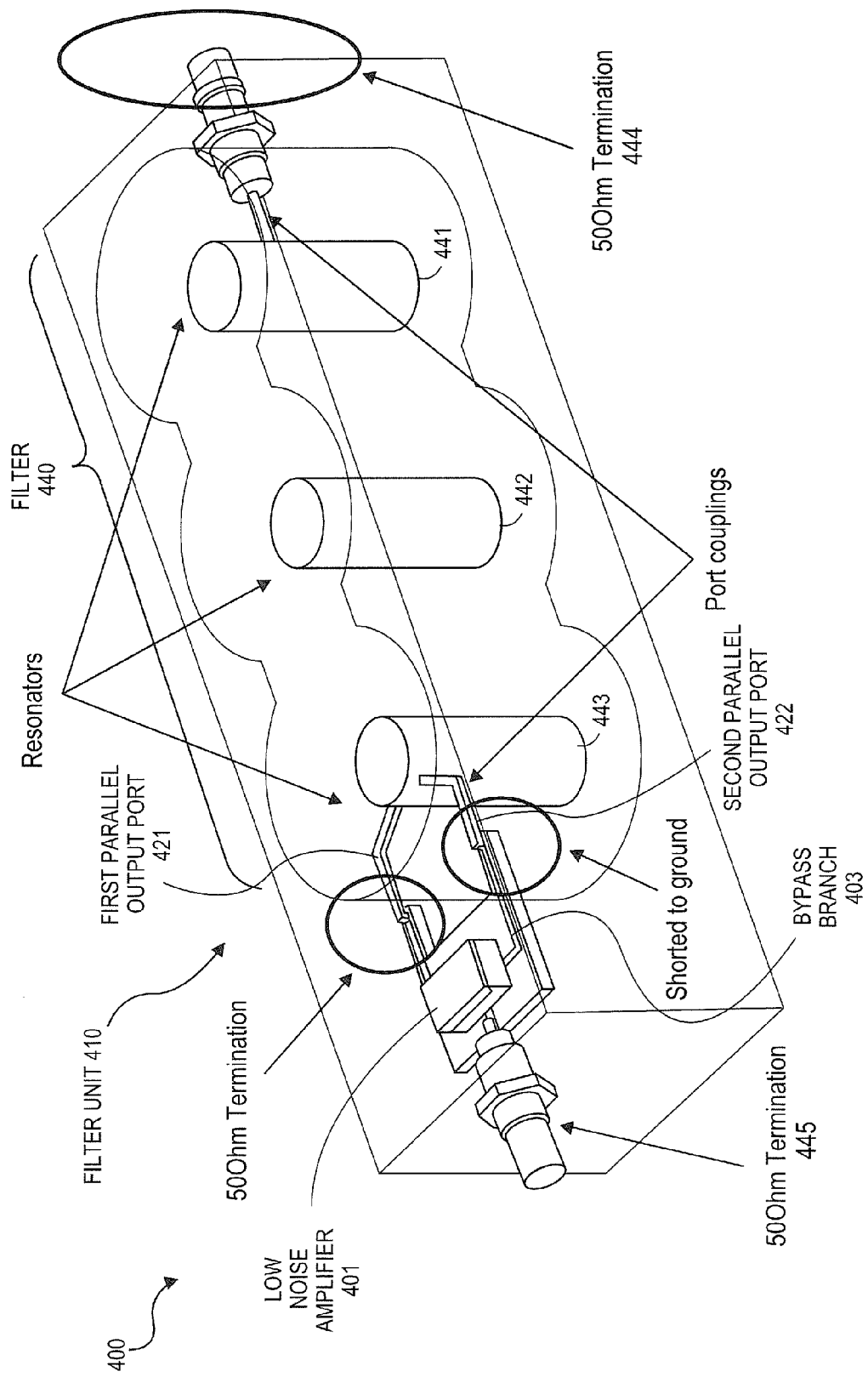
FIG. 4A illustrates a low noise amplifier (LNA) module having a filter unit according to one embodiment of the invention.
Figure 4B:
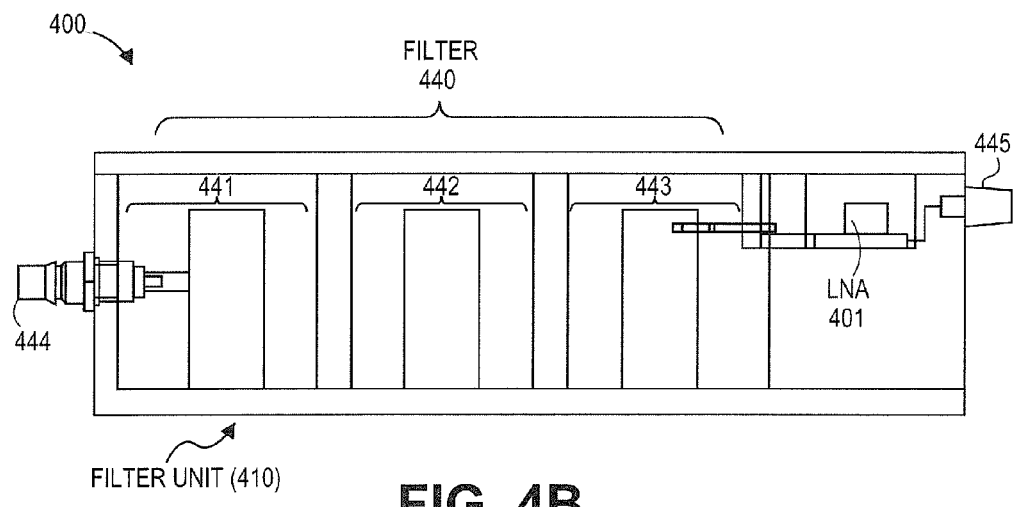
FIG. 4B illustrates a low noise amplifier (LNA) module having a filter unit according to one embodiment of the invention.
Figure 4C:
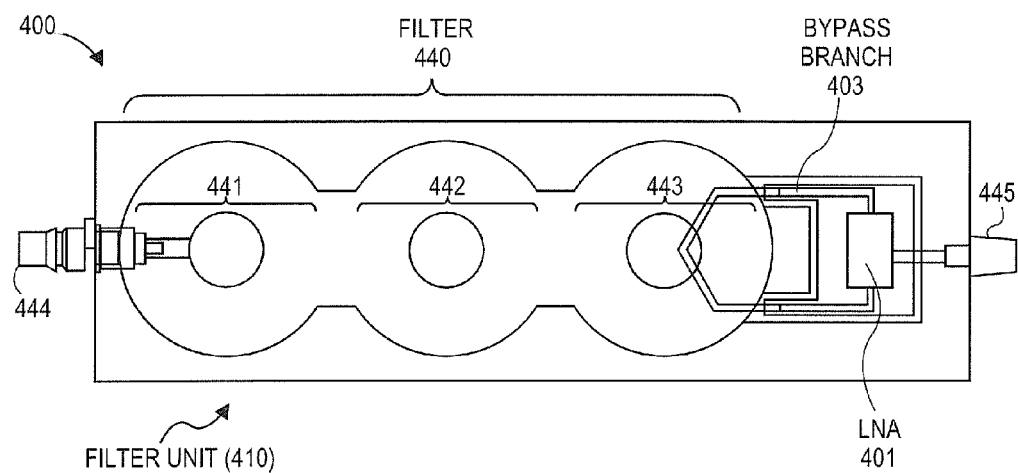
FIG. 4C illustrates a low noise amplifier (LNA) module having a filter unit according to one embodiment of the invention.

FIGS. 4A-4C illustrate a low noise amplifier (LNA) module 400 having a filter unit 410 according to one embodiment of the invention. Depicted filter unit 410 includes a filter 440 to filter out any undesired current (e.g., signals) from the received radio frequency signal. Filter 440 in FIG. 4 is a metal cavity filter, having three cavities (441-443), although a single or any plurality of cavities can be used. For example, a radio frequency signal (or other signal, etc.) can flow into input 444 of LNA module 400 and then into each of the series cavity filters (440) and into the parallel output ports (421, 422). As discussed in reference to FIGS. 2A-3, in FIG. 4, first parallel output port 421 connects to LNA 401 and second parallel output port 422 is selectively connectable to bypass branch 403. Output 445 can then selectively connect to the branch that is desired, e.g., an amplified by the LNA output or an output from the bypass branch, and/or the other branch can be connected to the connection providing a substantially full reflection.

Figure 5:
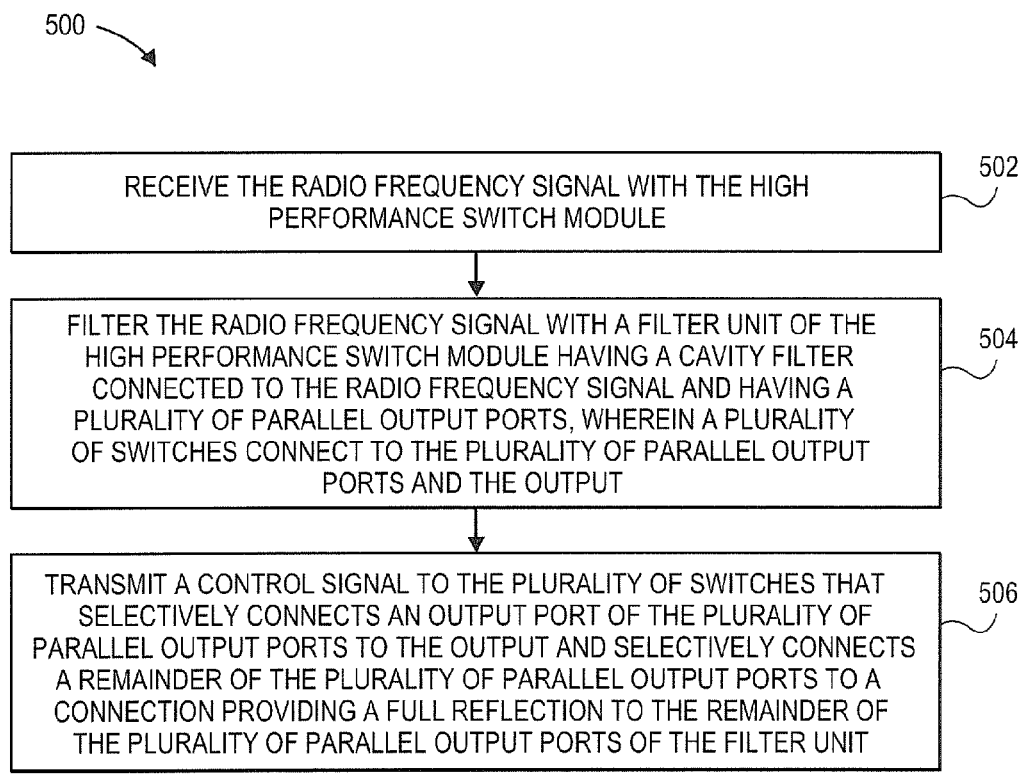
FIG. 5 illustrates a method implemented in a high performance switch module according to one embodiment of the invention.

FIG. 5 illustrates a method 500 implemented in a high performance switch module according to one embodiment of the invention. The method implemented in a high performance switch module (100) to filter a radio frequency signal (102) and to selectively connect to an output (111, 112, 113), includes receiving (502) the radio frequency signal (102) with the high performance switch module (100); filtering (504) the radio frequency signal with a filter unit (210, 310, 410) of the high performance switch module having a filter (440) connected to the radio frequency signal and having a plurality of parallel output ports (121, 122, 123), wherein a plurality of switches (131, 132, 133) connect to the plurality of parallel output ports and the output; and transmitting (506) a control input to the plurality of switches that selectively connects an output port (121, 122, 123) of the plurality of parallel output ports to the output and selectively connects a remainder of the plurality of parallel output ports to a connection (104, 106, 108) providing a substantially full reflection to the remainder of the plurality of parallel output ports of the filter unit.

Figure 6:
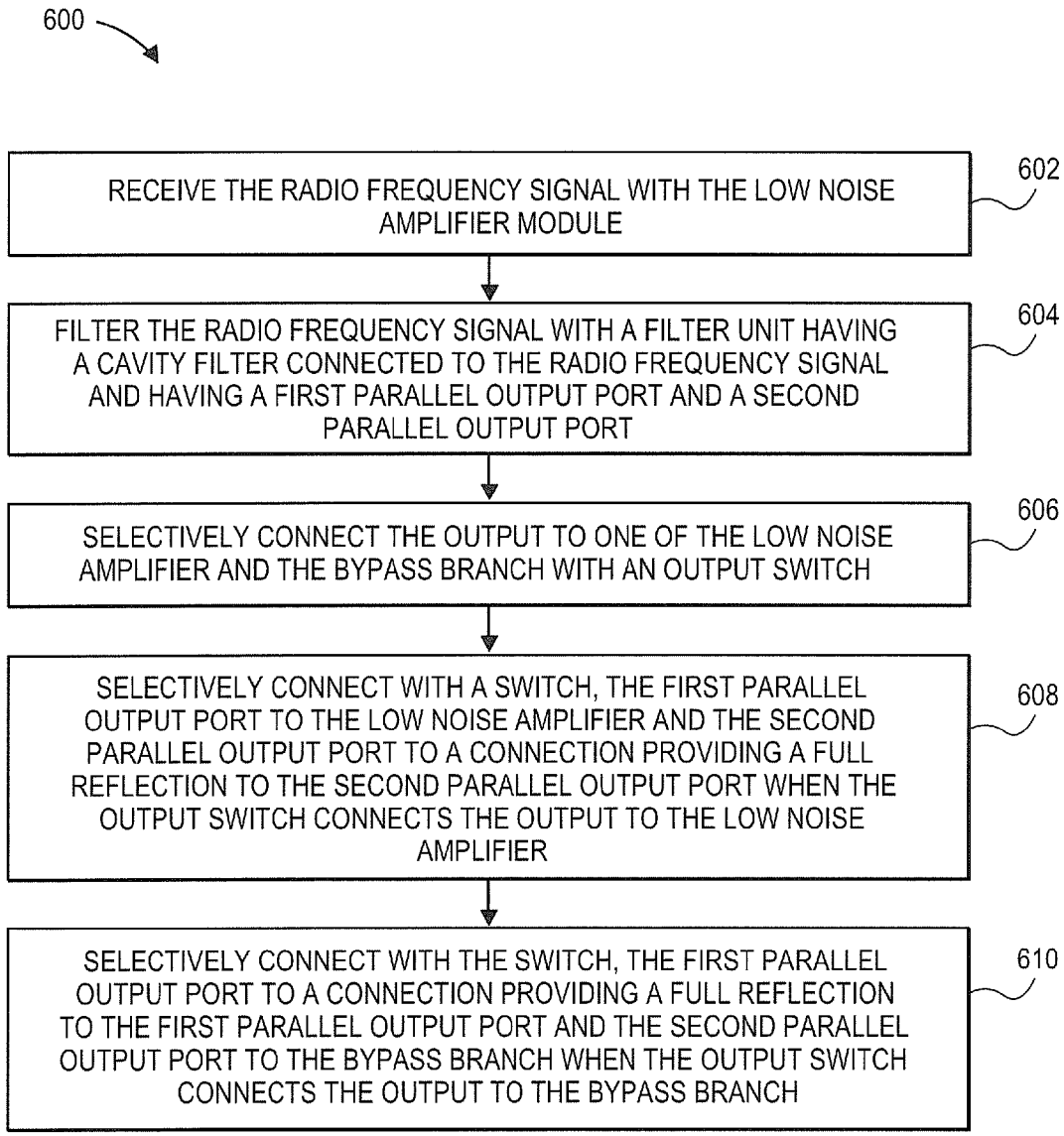
FIG. 6 illustrates a method implemented in a low noise amplifier module according to one embodiment of the invention.

FIG. 6 illustrates a method 600 implemented in a low noise amplifier module according to one embodiment of the invention. The method implemented in a low noise amplifier module (200, 300) having a bypass branch (203, 303) to selectively supply a radio frequency signal (202, 302) without amplification from a low noise amplifier (201, 301) to an output (211, 311), including receiving (602) the radio frequency signal with the low noise amplifier module; filtering (604) the radio frequency signal with a filter unit (210, 310, 410) having a filter (440) connected to the radio frequency signal and having a first parallel output port (221, 321) and a second parallel output port (222, 322); selectively connecting (606) the output to one of the low noise amplifier and the bypass branch with an output switch (233, 333); selectively connecting (608) with a switch (231, 232, 331, 332), the first parallel output port to the low noise amplifier and the second parallel output port to a connection (206, 307) providing a substantially full reflection to the second parallel output port when the output switch connects the output to the low noise amplifier; and selectively connecting (610) with the switch, the first parallel output port to a connection (204, 305) providing a substantially full reflection to the first parallel output port and the second parallel output port to the bypass branch when the output switch connects the output to the bypass branch.

A low noise amplifier (LNA) module and/or method according to this disclosure (e.g., as depicted as encircled by dotted lines in the figures) can be used in (e.g., integrated into) mobile user equipment, for example, a LNA module in mobile stations such as mobile telephones (i.e., cellular telephones) and/or laptops, tablets, etc. with mobile termination. Mobile user equipment may include, but is not limited to, portable, pocket, hand-held, computer-included, or car-mounted mobile devices which communicate voice and/or data with a radio access network.

It should be understood that the operations of the flow diagrams in FIGS. 5 and 6 can be performed by embodiments of the invention other than in FIGS. 1-4, and the embodiments of the invention discussed with reference to these other Figures can perform operations different than those discussed with reference to the flow diagrams.

Transitory machine-readable transmission media can include electrical, optical, acoustical or other form of propagated signals, such as carrier waves or infrared signals). In addition, a controller can include hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention can be implemented using different combinations of software, firmware, and/or hardware. While the flow diagrams in the figures show a particular order of operations performed by certain embodiments of the invention, it should be understood that such order is exemplary (e.g., alternative embodiments can perform the operations in a different order, combine certain operations, overlap certain operations, etc.).

While the invention has been described in terms of several embodiments, those skilled in the art will recognize that the invention is not limited to the embodiments described, can be practiced with modification and alteration within the disclosure and scope of the appended claims. The description is thus to be regarded as illustrative instead of limiting.

What is claimed is:

1. A low noise amplifier module having a bypass branch to selectively supply a received radio frequency signal, without amplification from a low noise amplifier (LNA), to an output comprising:
   a filter unit having a filter configured to connect to the received radio frequency signal and having a first parallel output port and a second parallel output port to provide parallel outputs of a filtered radio frequency signal;
   an output switch selectively connecting the output to an output of the LNA during a LNA mode of operation and connecting the output to the bypass branch during a bypass mode of operation;
   a first switch to selectively connect the filtered radio frequency signal of the first parallel output port to an input of the LNA for amplification by the LNA during the LNA mode and to a short or a ground connection to provide a substantially full reflection to the first parallel output port during a bypass mode of operation; and
   a second switch to selectively connect the filtered radio frequency signal of the second parallel output port to the bypass branch for connection to the output during the bypass mode and to the short or the ground connection to provide a substantially full reflection to the second parallel output port during the LNA mode,
   wherein the first switch and the second switch are operated by a respective control voltage.

2. The low noise amplifier module of claim 1, wherein each of the first switch and the second switch comprises at least one of a PIN diode or a microelectromechanical systems (MEMS) switch.

3. The low noise amplifier module of claim 1, wherein the connection providing the substantially full reflection to the first parallel output port and the connection providing the substantially full reflection to the second parallel output port comprise the short connection.

4. The low noise amplifier module of claim 1, wherein the connection providing the substantially full reflection to the first parallel output port and the connection providing the substantially full reflection to the second parallel output port comprise the ground connection.

5. The low noise amplifier module of claim 1, wherein the low noise amplifier module is implemented in a base station of a wireless communication system.

6. The low noise amplifier module of claim 1, wherein the first switch comprises a first diode and a first inductor serially connected between the first parallel output port and a first control voltage and a first capacitor connected between a junction, of the first diode and the first inductor connection, and the short or the ground connection; and wherein the second switch comprises a second diode and a second inductor serially connected between the second parallel output port and a second control voltage and a second capacitor connected between a junction, of the second diode and the second inductor connection, and the short or the ground connection.

7. The low noise amplifier module of claim 1, wherein the first switch comprises a first PIN diode and a first inductor serially connected between the first parallel output port and a first control voltage and a first capacitor connected between a junction, of the first PIN diode and the first inductor connection, and the short or the ground connection; and wherein the second switch comprises a second PIN diode and a second inductor serially connected between the second parallel output port and a second control voltage and a second capacitor connected between a junction, of the second PIN diode and the second inductor connection, and the short or the ground connection.

8. A method implemented in a low noise amplifier module having a bypass branch to selectively supply a radio frequency signal, without amplification from a low noise amplifier (LNA), to an output, the method comprising:
   receiving the radio frequency signal;
   filtering the radio frequency signal with a filter unit having a filter connected to the radio frequency signal and having a first parallel output port and a second parallel output port to provide parallel output of a filtered radio frequency signal;
   selectively connecting with an output switch, the output to an output of the LNA during a LNA mode of operation and connecting the output to the bypass branch during a bypass mode of operation;
   selectively connecting with a first switch, the filtered radio frequency signal of the first parallel output port to an input of the LNA for amplification by the LNA and selectively connecting with a second switch, the bypass branch to a short or a ground connection to provide a substantially full reflection to the second parallel output port during the LNA mode; and
   selectively connecting with the first switch, the filtered radio frequency signal of the first parallel output part to the short or the ground connection to provide a substantially full reflection to the first parallel output port and selectively connecting with the second switch, the filtered radio frequency signal of the bypass branch onto the output during the bypass mode,
   wherein the first switch and the second switch are operated by a respective control voltage.

9. The method of claim 8, further comprising selectively connecting the first parallel output port to the short or ground connection using a PIN diode or a microelectromuechanical systems (MEMS) switch; and
   selectively connecting the bypass branch to the short or ground connection using a PIN diode or a microelectromechanical systems (MEMS) switch.

10. The method of claim 8, further comprising selectively connecting with the second switch, the second parallel output port to the short connection during the LNA mode.

11. The method of claim 8, further comprising selectively connecting with the first switch, the first parallel output part to the short connection during the bypass mode.

12. The method of claim 8, further comprising selectively connecting with the second switch, the second parallel output port to the ground connection during the LNA mode.

13. The method of claim 8, further comprising selectively connecting with the first switch, the first parallel output port to the ground connection during the bypass mode.

* * * * *